United States Patent
Masserey et al.

(10) Patent No.: US 7,300,256 B2
(45) Date of Patent: Nov. 27, 2007

(54) DAMPING ARRANGEMENT FOR A BLADE OF AN AXIAL TURBINE

(75) Inventors: Pierre-Alain Masserey, Würenlos (CH); Dariusz Szwedowicz, Morelos (MX); Jaroslaw Szwedowicz, Zurzach (CH)

(73) Assignee: ALSTOM Technology Ltd., Baden (CH)

( * ) Notice: Subject to any disclaimer, the term of this patent is extended or adjusted under 35 U.S.C. 154(b) by 186 days.

(21) Appl. No.: 10/997,885

(22) Filed: Nov. 29, 2004

(65) Prior Publication Data

US 2007/0253828 A1    Nov. 1, 2007

(30) Foreign Application Priority Data

Dec. 2, 2003    (DE)    ................. 103 56 237

(51) Int. Cl.
  *F01D 5/16*    (2006.01)
(52) U.S. Cl. ...................... 416/230; 416/232
(58) Field of Classification Search .......... 416/232, 416/500, 230
  See application file for complete search history.

(56) References Cited

U.S. PATENT DOCUMENTS 2,809,802 A * 10/1957 Suits ................. 416/230
2,984,453 A * 5/1961 Heymann ............. 416/229 R
4,460,314 A * 7/1984 Fuller .................. 416/145
5,284,011 A    2/1994 Von Benken
6,607,359 B2   8/2003 Von Flotow
6,676,380 B2 * 1/2004 Davis et al. ............ 416/230

FOREIGN PATENT DOCUMENTS

| DE | 535460      | 10/1931 |
| DE | 553716      | 6/1932  |
| DE | 1 090 231   | 10/1960 |
| WO | 01/49975 A1 | 7/2001  |

OTHER PUBLICATIONS

Search Report from 103 56 237.0 (Mar. 2, 2004).

* cited by examiner

*Primary Examiner*—Edward K. Look
*Assistant Examiner*—Devin Hanan
(74) *Attorney, Agent, or Firm*—Adam J. Cermak; Cermak Kenealy & Vaidya LLP

(57) ABSTRACT

A damping arrangement for a blade (20) of an axial turbine, in particular a gas turbine, includes a damping element (17) which is arranged in a recess (16) in the blade aerofoil (10) of the blade (20) and frictionally dampens the vibrations of the blade (20). In such a damping arrangement, simplified manufacture and assembly and a reliable and effective function are achieved by the recess being configured as a cavity (16) extending in the radial direction through the inside of the blade aerofoil (10), the damping element (17) being inserted in the radial direction into said cavity (16).

10 Claims, 2 Drawing Sheets

DAMPING ARRANGEMENT FOR A BLADE OF AN AXIAL TURBINE

This application claims priority under 35 U.S.C. § 119 to German application number 103 56 237.0, filed 2 Dec. 2003, the entirety of which is incorporated by reference herein.

BACKGROUND OF THE INVENTION

1. Field of the Invention

The present invention relates to the field of turbine technology. It concerns a damping arrangement for a blade of an axial turbine.

2. Brief Description of the Related Art

The rotor blades of axial turbines, for example gas turbines, extend in the radial direction and are mounted on the outer periphery of the rotor which rotates about the rotor axis. They can be configured as free-standing blade aerofoils in a turbine stage but can also be connected to one another on their outer periphery by a shroud, a snubber or a lacing wire.

During the operation of the turbine, the blades are excited to vibrate by the interaction with the medium flowing at high velocity through the turbine and by the rapid rotation; loads are imposed on the blades and bearings and have a disadvantageous effect on the efficiency. Various proposals to damp the vibrations occurring in the blades have, therefore, already been made in the past. Some of these proposals are limited to providing special damping elements in the region of the blade fastening. Although this has the advantage that no modifications have to be undertaken on the blade aerofoil itself, it has the disadvantage that vibrations in the blade aerofoil can only be influenced very indirectly.

In other proposals, therefore, there has been a movement toward arranging and accommodating damping elements in the blade aerofoil itself, which elements influence the vibrations directly within the blade aerofoil. As an example, a damping arrangement for the rotor blades of a turbine is known from EP-B1-0 727 563, in which arrangement a circular recess or pocket is arranged in the outer third of the blade aerofoil at the center of the pressure surface, which pocket accommodates a (sinusoidal) damping element. The pocket is closed toward the outside by a pocket cover matched to the blade aerofoil contour. The damping element is in contact with the inner walls of the pocket and the pocket cover at some locations and, by means of its movement relative to the blade, damps the vibrations occurring in the blade aerofoil by friction on the walls. Disadvantageous features of this known damping arrangement are the complicated construction of the pocket and pocket cover and the spatial limitation of the damping arrangement to a very small region of the blade aerofoil.

On the other hand, the solution proposed in U.S. Pat. No. 6,607,359 manages without a cover. In this solution, a simply shaped damping element is inserted in such a way into a specially prepared pocket that the outwardly directed surface of the damping element seamlessly continues the pressure surface of the blade aerofoil. This solution also requires complicated and accurate processing of the individual elements of the damping device and only permits locally limited damping.

In WO-A1-01/49975, a narrow air chamber is formed on the suction surface of the blade by generating a recess and subsequently covering by (welding on) a cover. This has, due to the viscosity of the moving air, a damping effect on the blade vibrations which occur. This type of damping is not very flexible and likewise requires complicated and accurate processing and/or reworking of the blade surface in order to avoid aerodynamic disadvantages due to the installation of the damping device.

Summarizing in the case of the solutions mentioned above, it can be stated, on the one hand, that complicated and careful machining is necessary because of the action on the aerodynamically important blade surface and, on the other, that damping can only be realized in narrowly limited regions.

SUMMARY OF THE INVENTION

One of numerous aspects of the present invention is, therefore, providing a damping arrangement for blades of axial turbines, which damping arrangement is simple in construction, effective in action and effective over a large region of the blade aerofoil.

Another aspect of the present invention includes accommodating the damping element of the damping arrangement in a recess, which is configured as a cavity extending in the radial direction through the inside of the blade aerofoil, into which cavity the damping element is inserted in the radial direction. Due to the cavity which extends in the radial direction and into which the damping element is introduced in the radial direction, the outer contour of the blade aerofoil remains uninfluenced by the damping appliance. Because the cavity extends over wide segments of the blade aerofoil, the vibrations can be very effectively damped over the whole of the blade aerofoil.

An exemplary embodiment of the invention is characterized in that the cavity and the damping element inserted into the cavity have cylindrical configurations. By this means, the manufacture and installation of the damping device are further simplified.

A first development of the invention is characterized in that the damping element is configured in such a way that the frictional damping process takes place within the damping element, the damping element preferably containing a damping medium, in particular in the form of a highly viscous fluid. In contrast to the known state of the art (see W0-A1-01/49975), the element which contains the damping medium can be manufactured separately from the blade in a simple manner and can be very easily introduced into the blade.

Another development of the invention is characterized in that the damping element is configured in such a way that the frictional damping process takes place essentially between the damping element and the wall of the cavity. The damping element is then preferably of integral configuration and presses elastically against the wall of the cavity. For this purpose, the damping element is, in particular, configured as a spring material sheet, in particular a spring steel sheet, wound about the cylinder axis.

The cavity can, depending on the requirement, be accessible from the inner or outer end of the blade. In one case, the blade comprises a stem, a platform and the blade aerofoil, which are arranged sequentially in the radial direction from the inside to the outside. The cavity for accommodating the damping element then extends from the outer end of the blade aerofoil through the blade aerofoil to the vicinity of the platform and is only accessible from the outer end of the blade aerofoil. The cavity can then be closed by a closing element at the outer end of the blade aerofoil. Although an additional closing element is required in this case, the damping device can be fitted or modified when the blade has already been fastened to the rotor.

In the other exemplary case, the cavity for accommodating the damping element extends, for the same blade configuration, from the inner end of the stem to far within the blade aerofoil and is only accessible from the inner end of the stem. In this case, the damping element must be installed before fitting of the blade onto the rotor. It is then, however, possible to dispense with a closing element.

BRIEF DESCRIPTION OF THE DRAWINGS

The invention is explained in more detail below in conjunction with the drawing, using exemplary embodiments. In the drawing.

DETAILED DESCRIPTION OF EXEMPLARY EMBODIMENTS

Figure 1:
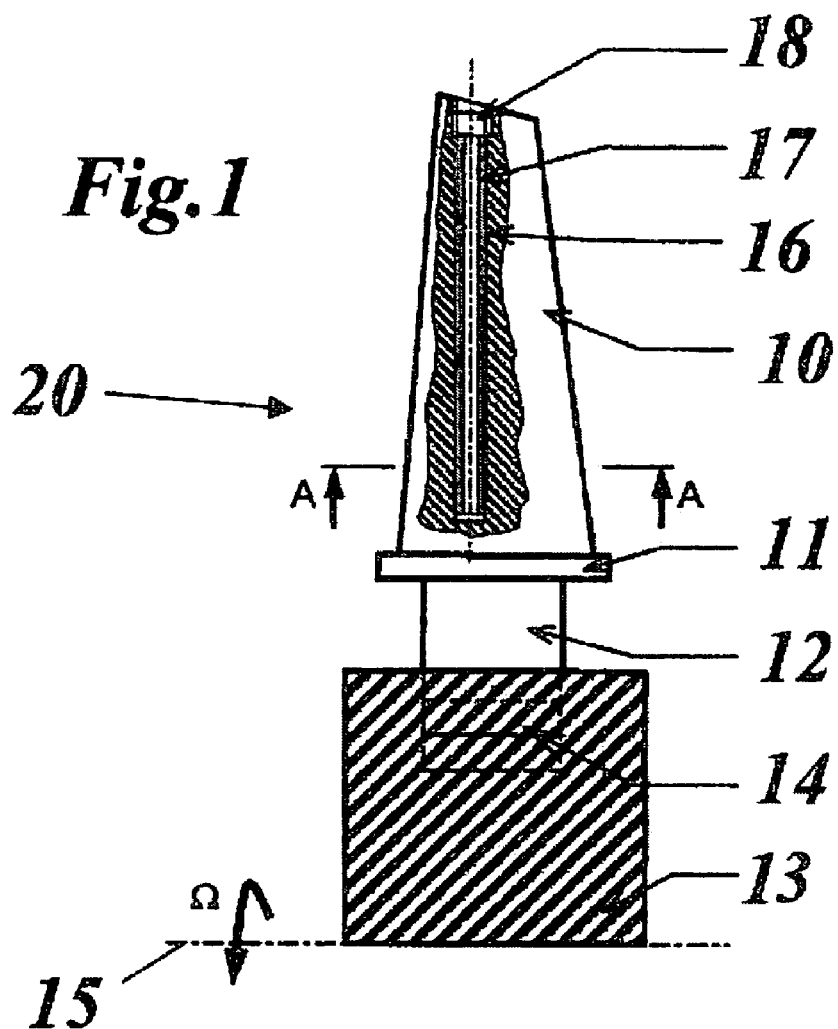
FIG. 1 shows the partially sectioned side view of a turbine blade with a radial damping arrangement according to a first preferred exemplary embodiment of the invention.

The present invention relates to a blade arrangement with a damping appliance. As shown in FIG. 1, a blade 20 is mounted as an axial blade at the periphery of a rotor section 13 of a rotor rotating with an angular velocity $\Omega$ about a rotor axis 15, the blade 20 extending in the radial direction. The blade 20 comprises, sequentially in the radial direction from the inside to the outside, a stem 12, a platform 11 and the actual blade aerofoil 10. The blade 20 is inserted into an appropriate recess in the rotor section 13 by means of a usually fir-tree shaped blade root 14 at the bottom end of the stem 12. The blade aerofoils 10 of the blades of a turbine stage arranged in a ring around the rotor axis 15 can either have a free-standing configuration or be connected together at the blade tips by a shroud, a damping device or a lacing wire.

Figure 3:
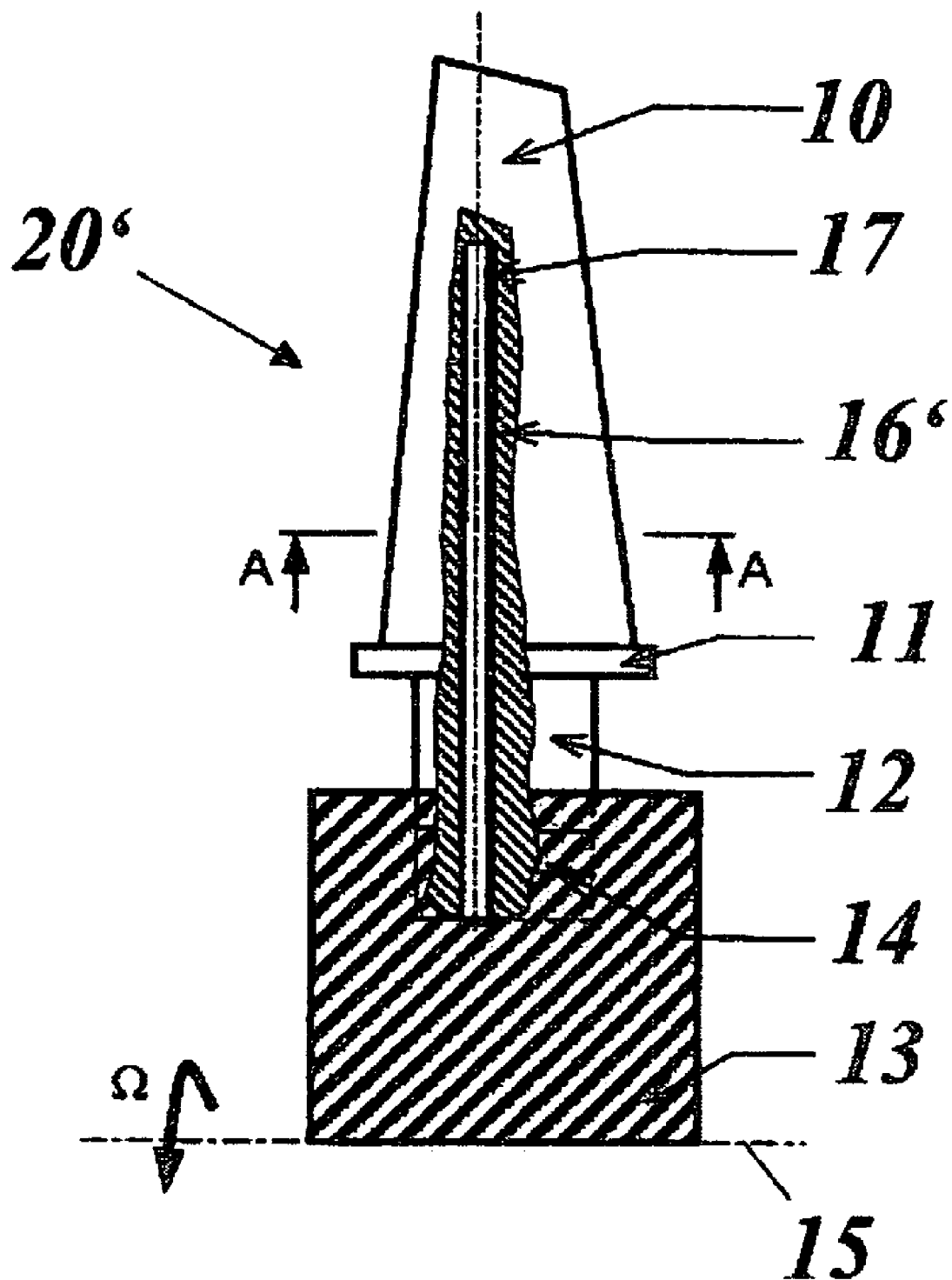

Extending in the radial direction, each blade 20 has a cylindrical cavity 16 which is arranged within the blade aerofoil 10. From the blade tip, the cavity 16 can be drilled, eroded or generated when casting the blade 20. However, it can also—as is shown in the case of the cavity 16' of the blade 20' in FIG. 3—be introduced in the same manner from the blade root 14 into the blade 20'. Because the maximum static and dynamic load usually occurs at the outer edges of the blade aerofoil 10, the hollow space 16 or 16' arranged within the blade aerofoil 10 does not lower the strength of the blade.

Figure 2:
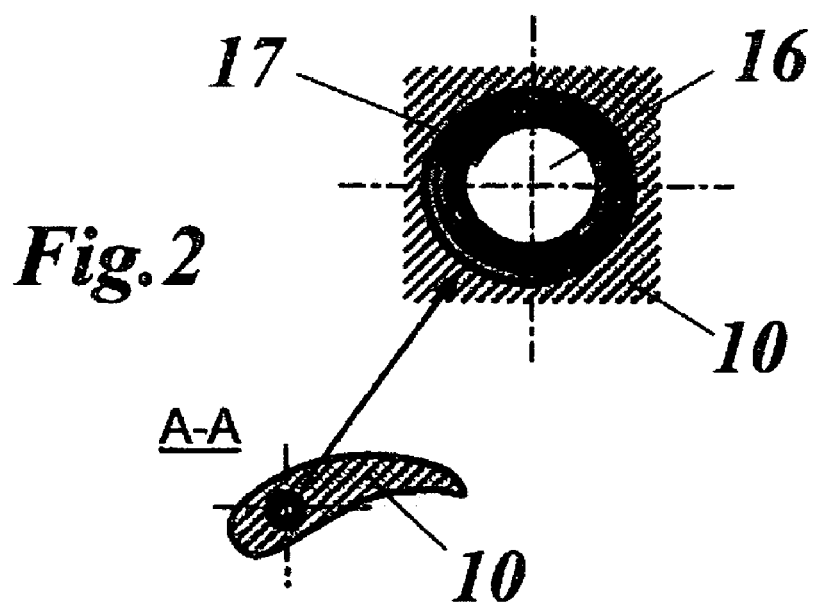
FIG. 2 shows the cross section through the damping arrangement of FIG. 1 on the plane A-A in the overall view and in an enlarged excerpt and FIG. 3 shows a side view, analogous to FIG. 1, of a turbine blade with a radial damping arrangement according to a second preferred exemplary embodiment of the invention (the section through the plane A-A again corresponds to that shown in FIG. 2).

The cylindrical damping element 17 accommodated in the cylindrical cavity 16 or 16' consists of a (for example rectangular) sheet of spring steel. The sheet is rolled up into a cylindrical shape about the cylinder axis so that a cylindrical friction spring is generated (enlarged excerpt in FIG. 2). The cylindrical spring obtained in this way is inserted (under spring loading) into the cavity 16 or 16'. It unrolls again partly within the cavity 16 or 16' and exerts, in this way, a contact pressure on the wall of the cavity 16 or 16'. The windings of the spring press against one another at the same time.

In the case of the cavity 16 extending from the blade tip into the blade aerofoil 10 (FIG. 1), the cavity 16 is closed by a closing element 18, which can be screwed as a bolt into a corresponding threaded hole. The thread of the bolt can be damaged in order to prevent autonomous release of the bolt due to blade vibrations. As an alternative to this, the closing element 18 can, however, also be firmly welded, provided the blade 10 is in a weldable alloy. If the cavity 16' extends from the blade root 14 into the blade 10 (FIG. 3), a closing element is unnecessary because the cavity 16' with the damping element 17 is closed by the rotor section 13 as soon as the blade 20' is fastened onto the rotor.

If, during the operation of the turbine, the blade 20 or 20' begins to vibrate, a rubbing relative motion occurs between the inner wall of the cavity 16 or 16' and the windings of the damping element 17 (the friction spring). The damping quality of the damping element 17 depends on the coefficient of friction and the contact pressure. The contact pressure builds up after the insertion into the cavity 16 or 16' because of the autonomous unwinding of the damping element due to the spring load. The magnitude of the contact pressure therefore depends on the number of windings and can be varied in a simple manner as a function of the dimensions of the blade aerofoil 10. For the various materials of the damping arrangement which are in frictional contact (spring steel, blade alloy), the coefficients of friction are known from the literature as a function of temperature. In order to maintain the effective damping properties of the damping element 17, the optimum value of the contact pressure can be experimentally confirmed by hammer test.

Instead of the cylindrical friction spring, another damping possibility within the framework of the invention consists in inserting, into the cylindrical cavity 16 or 16', a damping element (not shown in FIGS. 1-3) which does not damp by friction with the inner wall of the cavity but by a frictional process occurring within the damping element itself. Such an internal frictional process can, for example, be caused by a highly viscous fluid, for example an oil or another damping material, which is accommodated within the damping element.

As compared with the previously known damping arrangements for turbine blades, the present new solution is characterized by the following advantages:

1. The contact between the blade aerofoil and the damping element and the damping element itself are protected against the influence of gas, steam or exhaust gas flows. By this means, certain imponderables with respect to reliable functioning of the damping appliance can be excluded.

2. The damping element can prevent various bending vibrations of the blade aerofoil and its effectiveness is, in consequence, independent of plate vibrations which can be described by means of node diameters.

3. The effectiveness of the damping element does not depend directly on the rotational velocity of the disk fitted with the blades. The damping element can therefore be employed for a wide range of rotational velocities. This is particularly important in the case of turbines which operate with varying rotational speed, for example aircraft engines.

4. In the case of a failure of the damping element, all the damaged parts remain within the closed cavity and cannot therefore damage the turbine blades.

5. Because the effectiveness of the damping depends less on the rotational velocity, a multi-layer plate or a different material can be employed, instead of the sheet in spring steel, in order to improve the damping properties of the damping element.

LIST OF DESIGNATIONS

10 Blade aerofoil
11 Platform
12 Stem
13 Rotor section
14 Blade root
15 Rotor axis
16, 16' Cavity (cylindrical, radial)
17 Damping element (spring-shaped)
18 Closing element
20, 20' Blade (axial turbine)

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A damping arrangement for a blade of an axial turbine, which damping arrangement comprises:
    a blade having an aerofoil, the aerofoil including a recess;
    a damping element arranged in the aerofoil recess configured and arranged to frictionally dampen vibrations of the blade;
    wherein the recess comprises a cavity extending in a radial direction through the inside of the aerofoil, in which cavity the damping element is radially positioned;
    wherein said damping element includes a radially inner end positioned in said blade;
    wherein the cavity and the damping element have a cylindrical configuration; and
    wherein the damping element is hollow and configured and arranged so that the frictional dampening occurs between the damping element and a wall of the cavity.

2. The damping arrangement as claimed in claim 1, wherein the damping element comprises an integral configuration.

3. The damping arrangement as claimed in claim 1, wherein the damping element is configured and arranged to elastically press against a wall of the cavity.

4. The damping arrangement as claimed in claim 1, wherein the blade comprises a stem, a platform, and the aerofoil arranged in sequence from the inside to the outside of the blade;
    wherein the cavity extends from an outer end of the aerofoil through the aerofoil to the vicinity of the platform in order to accommodate the damping element and is only accessible from the outer end of the aerofoil; and
    further comprising a closing element configured and arranged to close the cavity at the outer end of the aerofoil.

5. The damping arrangement as claimed in claim 1, wherein the blade comprises a stem, a platform, and the aerofoil arranged in sequence in the radial direction from the inside to the outside of the blade; and
    wherein the cavity extends from an inner end of the stem to within the aerofoil in order to accommodate the damping element and is only accessible from the inner end of the stem.

6. A system comprising:
    a gas turbine; and
    the damping arrangement as claimed in claim 1.

7. The damping arrangement as claimed in claim 1, wherein the damping material includes a highly viscous fluid.

8. A damping arrangement for a blade of an axial turbine, which damping arrangement comprises:
    a blade having an aerofoil, the aerofoil including a recess;
    a damping element arranged in the aerofoil recess configured and arranged to frictionally dampen vibrations of the blade;
    wherein the recess comprises a cavity extending in a radial direction through the inside of the aerofoil, into which cavity the damping element is radially positioned;
    wherein the cavity and the damping element have a cylindrical configuration;
    wherein the damping element is configured and arranged so that the frictional dampening occurs between the damping element and a wall of the cavity;
    wherein the damping element is configured and arranged to elastically press against a wall of the cavity; and
    wherein the damping element comprises a spring material sheet wound around an axis of the cylinder.

9. The damping arrangement as claimed in claim 8, wherein the spring material sheet comprises a spring steel sheet wound around the axis of the cylinder.

10. The damping arrangement as claimed in claim 8, wherein said damping element includes a radially inner end positioned in said blade.

* * * * *